United States Patent [19]

Leopold

[11] Patent Number: 4,618,907
[45] Date of Patent: Oct. 21, 1986

[54] DESENSITIZED GROUND FAULT INTERRUPTER

[75] Inventor: Howard S. Leopold, Plainview, N.Y.

[73] Assignee: Eagle Electric Mfg. Co., Inc., Long Island City, N.Y.

[21] Appl. No.: 695,965

[22] Filed: Jan. 29, 1985

[51] Int. Cl.⁴ .............................................. H02H 3/26
[52] U.S. Cl. ...................................... 361/45; 361/46; 361/87
[58] Field of Search ...................... 361/42, 44, 45, 46, 361/87

[56] References Cited

U.S. PATENT DOCUMENTS 3,976,918  8/1976  Clark ...................................... 361/87
4,345,289  8/1982  Howell ................................... 361/45

Primary Examiner—A. D. Pellinen
Assistant Examiner—Jeffrey A. Gaffin
Attorney, Agent, or Firm—Kirschstein, Kirschstein, Ottinger & Israel

[57] ABSTRACT

A ground fault interrupter is rendered less sensitive to electrical noise by a densensitizing subcircuit. During the time the current to the load is interrupted a control chip is neither fully off nor fully on but is only slightly powered, that is it is desensitized. An LED indication is provided during the existance of a fault.

12 Claims, 2 Drawing Figures

DESENSITIZED GROUND FAULT INTERRUPTER

BACKGROUND OF THE INVENTION

1. Field of the Invention

This invention generally relates to a ground fault interrupter ("GFI") and, more particularly, to the improvements of desensitzing the interrupter to render the same less sensitive to electrical noise, and of visually indicating with an indicator light the detection of a ground fault condition.

2. Description of the Prior Art

It is well known in the prior art to provide ground fault protection for AC power outlets in consumer and industrial environments. For example, the standard GFI circuit included a differential transformer operative for sensing a current differential between the hot and neutral lines of an AC power supply, and for generating a transformer output signal indicative of the current differential. A fault from the hot line to ground or a fault from the neutral line to ground could be detected. In a common prior art approach, once the transformer output signal was equal to or greater than a predetermined current threshold, a control subcircuit, typically constituted by an integrated circuit control chip, generated an output control signal which triggered a silicon control rectifier into conduction. A solenoid coil was connected to the rectifier and, once the latter was triggered into conduction, a control circuit supply current, which typically measured on the order of amperes, from the AC power supply, was conducted through the solenoid coil to energize the same and, in turn, the contacts of a main line switch connected in the hot neutral lines between the AC power supply and the load were opened. The opening of the main line switch interrupted the hot and neutral lines, and the main line switch was latched in its open state to maintain the hot and neutral lines interrupted, thereby defining a tripped state in which the electrical outlet was protected from ground fault currents until the ground fault condition was corrected. In order for normal operation to ensue, the main line switch was re-set from its open latched state to its closed conducting state to permit a high-amperage line current again to flow from the AC power supply to the load.

In addition, once the ground fault condition was detected, the prior art also proposed the opening of an auxiliary electrical switch in series with the GFI circuit components in order to prevent any electrical power from reaching any of the components when the auxiliary switch was opened, which event occurred substantially simultaneously with the opening of the main line switch. The high-amperage control circuit supply current flowed through the auxiliary switch. Once the auxiliary switch was opened, the control circuit supply current no longer could flow to the GFI circuit components, and the GFI circuit was completely turned off.

Although generally satisfactory for their intended purpose, the prior art GFI circuits were possessed of certain drawbacks. For example, after a ground fault condition, the main hot and neutral lines were interrupted by the opened main line switch, and the GFI circuit was completely turned off by the opened auxiliary switch. Hence, there was no electrical power present to energize a light-emitting element such as an indicator lamp to signify the interruption of power due to a ground fault condition. The signaling of the ground fault condition would have been a very desirable feature, since it immediately visually would alert a user that a ground fault condition existed and should be corrected. At present, most GFI circuits which utilize an indicator lamp energize the latter only during the normal operating condition to signify thereby that no ground fault condition exists. When a ground fault condition, indeed, is detected, the typical prior art GFI circuit which is provided with an indicator lamp turns the latter off.

Also, the aforementioned prior art auxiliary switch was required to be a relatively expensive, heavy-duty switch in order to conduct the high-amperage supply currents therethrough. Even in a GFI circuit which did not utilize any indicator lamp, arcing across the contacts of the auxiliary switch when the same was opened, due to a ground fault condition, was disadvantageous, not only because of the extra expense required for such a heavy-duty switch, but also because of the potential safety hazard and short working lifetime of such switches.

In those prior art GFI circuits which were not shut off and which illuminated an indicator due to the ground fault condition, the GFI components, and particularly the differential transformer, were sensitive to such electrical noise as electrical transients, extraneous current and voltage signals, power supply fluctuations, hash and the like on the hot and neutral lines from the AC power supply. In some cases, it was possible that such electrical noise from the power supply lines could cause the differential transformer to generate a transformer output signal greater than the predetermined current threshold and cause the control chip again to generate an output control signal and re-trigger the silicon control rectifier which, in turn, could cause the solenoid coil again to be energized. The possibility that the differential transformer, the control chip, the rectifier and the solenoid coil again could be activated in response to electrical noise during the tripped state, and that the supply current again could flow through the solenoid coil and overheat the same, meant that these components were at risk and had to be specially designed, which increased the overall expense and made the overall design more complex.

SUMMARY OF THE INVENTION

1. Objects of the Invention

It is a general object of the present invention to overcome the aforementioned drawbacks of prior art GFI circuits.

It is another object of the present invention to desensitize the GFI circuit to electrical noise after a ground fault condition.

It is a further object of the present invention to visually indicate a ground fault condition by energizing a light indicator in response to the ground fault condition.

It is still another object of the present invention to simplify the overall design and decrease the overall expense of GFI circuits by eliminating the use of heavy-duty, high-amperage, rugged components.

It is yet another object of the present invention reliably to protect an electrical power outlet with a GFI circuit which is inexpensive to manufacture, simple in design, reliable in operation and durable in use.

2. Features of the Invention

In keeping with these objects and others which will become apparent hereinafter, one feature of the present invention resides, briefly stated, in an improved ground fault interrupter for protecting an electrical power outlet operative for supplying electrical alternating current along hot and neutral lines to a load. The interrupter includes means, preferably a differential transformer, for sensing a current differential between the lines, and for generating a sense or transformer output signal indicative of the current differential; and control means operatively connected to the sensing means and energizable from an off state. The control means is operative for comparing the transformer output signal to a predetermined current threshold indicative of a ground fault condition, and for interrupting the supply of current to the load when the transformer output signal is equal to, or greater than, the predetermined current threshold.

In a preferred embodiment, the control means includes a control subcircuit, preferably an integrated circuit control chip, for generating an output control signal when the transformer output signal is at least equal to the predetermined current threshold; a gate element, preferably a silicon control rectifier, triggerable into a current-conducting state when the control signal is generated; a solenoid coil energizable upon triggering of the gate element; and a main line switch operatively connected to the solenoid coil and operative for interrupting the supply of line current to the load when the solenoid coil has been energized.

In accordance with one improvement of the present invention, means are provided in operative connection to the control means for desensitizing the same, and for maintaining the control means in a desensitized state after the ground fault condition has been sensed and the supply of current to the load has been interrupted. The desensitized state is between the off state and a normally operating on state for the control means. Put another way, the control means is not fully deenergized nor fully energized but, instead, is only slightly energized in an intermediate state between the deenergized and the fully energized states. This intermediate desensitized state provides enough power therein to illuminate a visual indicator lamp, as described in further detail below, but not enough power to enable the control means to operate in its normally intended mode. In other words, the control means has been rendered less sensitive to electrical noise because, even should the sensed transformer output signal be equal to, or greater than, the predetermined current threshold, the control means will not be reactivated.

In accordance with one advantageous embodiment of this invention, the desensitizing means includes means for conditioning the transformer output signal to be less than the predetermined current threshold, and it is further advantageous if the transformer output signal is caused to approach a zero value. In this embodiment, an auxiliary electrical switch is connected across a pair of outputs of the differential transformer, and the auxiliary switch operatively is connected to the control means and is switchable by the latter from an open to a closed switching state, thereby to short the outputs of the differential transformer. Once the differential transformer outputs are shorted, no transformer output signal exists to be compared with the predetermined current threshold and, in other words, the control means has been rendered inoperative for its normally intended mode of operation.

In accordance with another advantageous embodiment of this invention, starving means are provided for supplying power at a value greater than zero but less than the rated value at which the control chip is intended to operate. For example, if the control chip is intended to be normally operational when a supply voltage of 30 volts is applied to its power supply terminal, then the starving means is operative, in a purely exemplificative manner, to supply about 3 volts to the supply input terminal. As noted above, the control chip is turned neither fully off, nor fully on; rather, it is only slightly powered.

In this latter embodiment, the starving means advantageously may comprise a visual indicator, e.g. a light-emitting diode, for emitting light in response to the ground fault condition and during the time that the current to the load has been interrupted; a surge-limiting resistor in series with the diode; and an auxiliary switch operatively connected to the control means and switchable by the latter from an open to a closed switching state. Alternatively, a clamping diode, or even a resistor, could be utilized in place of a light-emitting diode in order to provide a reduced voltage at the power supply input to the control chip.

Yet another advantage of this invention resides in the feature of visually indicating the detection of the ground fault condition while the current interruption to the load exists, by means of switching on an indicator lamp. This is highly desirable since it immediately alerts a user that a ground, fault condition existed, and that the current interruption to the load still exists, as opposed to most prior art embodiments which extinguish an indicator lamp in response to the ground fault condition.

In both of the aforementioned embodiments, the auxiliary switch is not located in a portion of the control means where it is required to conduct therethrough a high-amperage line current. Instead, a lower-amperage supply current having a magnitude much less than the line current flows through the auxiliary switch. This alleviates the aforementioned arcing problem with its associated short working lifetime and potential safety hazard.

The novel features which are considered as chacteristics of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
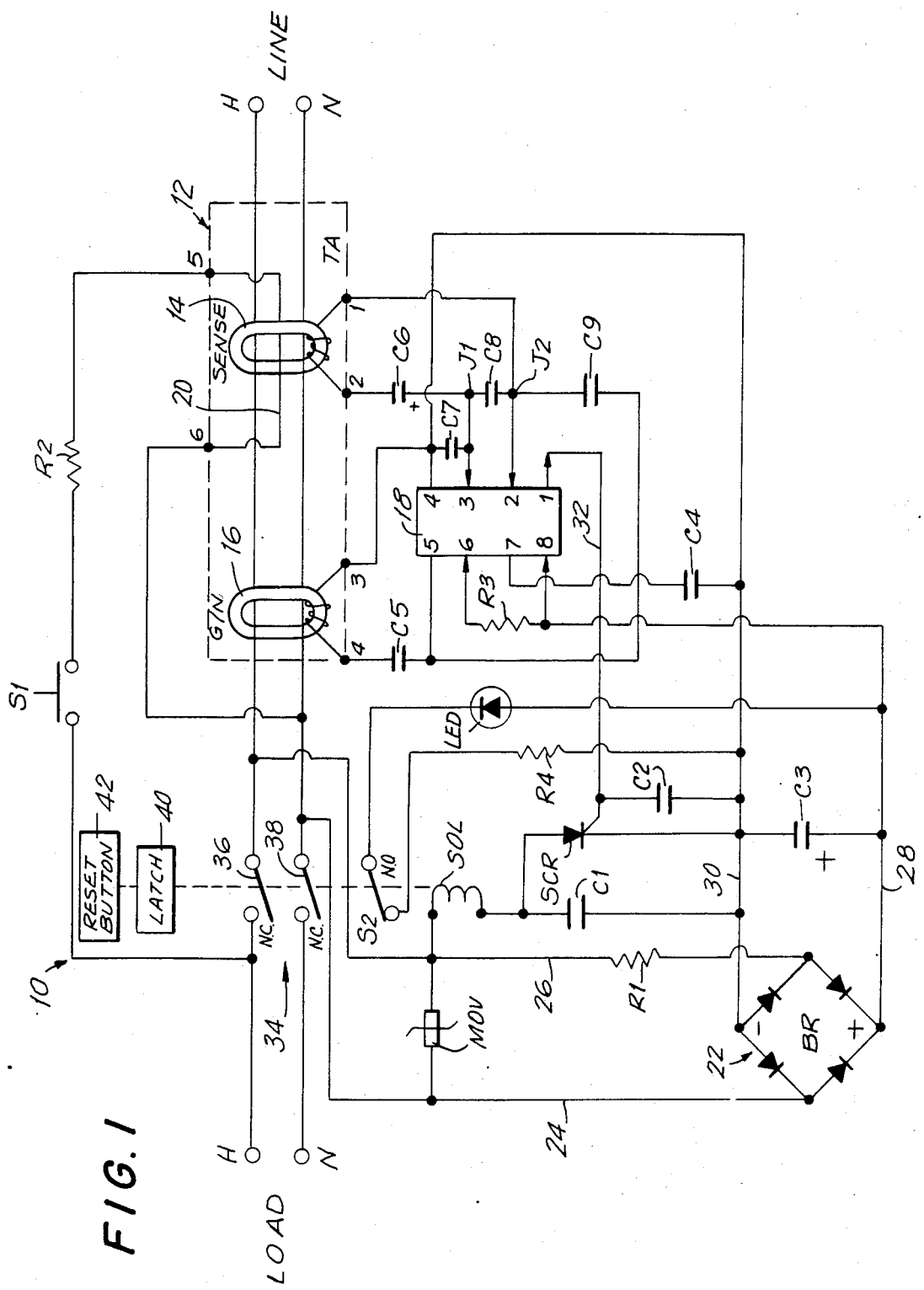
FIG. 1 is an electrical circuit schematic of an improved ground fault interrupter in accordance with one embodiment of this invention.
Figure 2:
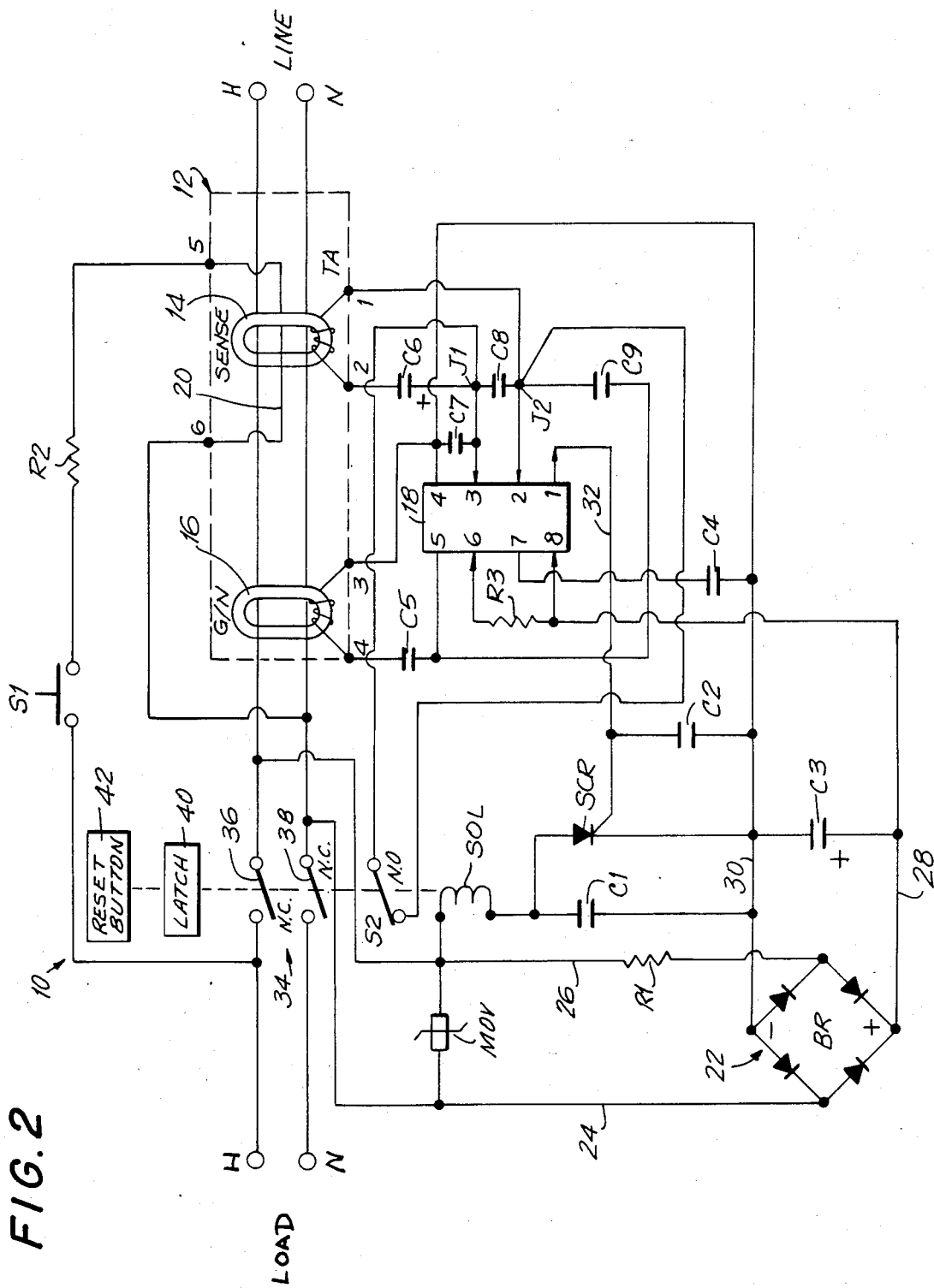
FIG. 2 is an electrical circuit schematic of another improved ground fault interrupter in accordance with another embodiment of this invention.

Referring now to the drawings, like reference numerals have been employed in the two embodiments of FIGS. 1 and 2 to identify like components of the ground fault interrupter (GFI) circuit. The GFI circuit 10 operatively is connected to hot (H) and neutral (N) lines that are connected between an AC power outlet, typically 120v AC, and a load. The power outlet supplies electrical line current and voltage along the lines H, N through the GFI circuit 10 to the load. As explained below, the GFI circuit is operative for protecting the power outlet from ground faults which occur from either the H line to ground or from the N line to ground.

The GFI circuit 10 comprises a transformer assembly 12 having a differential transformer or sense (SENSE) coil 14 having a winding connected across output terminals 1, 2, and another transformer or grounded neutral (G/N) coil 16 having a winding connected across output terminals 3, 4. The H, N lines are successively routed through the interiors of the coils 14, 16 so that the currents flowing through each of the lines are sensed. The SENSE coil 14 is operative to sense a ground fault current between the H line and ground by sensing a current differential between the H and N lines, generating a sense or transformer output signal indicative of the magnitude of the sensed current differential, and conducting the transformer output signal to the transformer output terminals 1, 2 and, thereupon, to a control subcircuit 18 which, preferably, is fabricated as an integrated circuit chip.

In the preferred case, the control chip 18 is manufactured by the National Semiconductor Corporation as its Model No. LM1851 GFI chip. The control chip 18 has a trigger output terminal 1, an inverting input terminal 2, a non-inverting input terminal 3, a ground terminal 4, a sense amplifier output terminal 5, a sensitivity set resistor terminal 6, a timing capacitor terminal 7, and a voltage supply terminal 8. Transformer output terminal 1 directly is connected to chip input terminal 2. Transformer output terminal 2 is connected through capacitor C6 to chip input terminal 3. One side of a capacitor C8 is connected to junction J1 which is located between capacitor C6 and chip input terminal 3. The other side of the capacitor C8 is connected to junction J2 which is located between transformer output terminal 1 and chip input terminal 2.

The G/N coil 16 is operative, in conventional manner, to help advise when a connection between the N line and ground exists. The G/N coil 16 injects a voltage onto the H and N lines, and enables a signal indicative of the ground to neutral fault resistance to be developed by SENSE coil 14 at output terminals 1, 2. Transformer input terminal 4 is connected by capacitor C5 to chip output terminal 5, and also is connected by capacitor C9 to junction J2. Transformer input terminal 3 is connected to chip ground terminal 4. Capacitor C7 is connected across chip terminals 3 and 4.

The transformer assembly 12 has a test loop subcircuit wherein a manually-operated test switch S1 and a series resistor R2 are connected between the H line and a transformer test loop terminal 5. Within the transformer assembly 12, an additional test loop wire 20 is routed through the interior of the SENSE coil 14 to another test loop terminal 6 which is connected to the N line.

The GFI circuit further comprises a full wave bridge rectifier 22 connected by conductors 24, 26 across the N and H lines, respectively. A voltage dropping resistor R1 is located in conductor 26. A varistor (MOV) is connected across the conductors 24, 26. The bridge rectifier 22 and resistor R1 are operative to convert the approximately 120v AC line voltage to about 30v DC across a power conductor 28 and a ground conductor 30. A capacitor C3 is connected across the conductors 28, 30. Power conductor 28 directly is connected to voltage supply terminal 8 of chip 18 to supply the rated voltage thereto. The 30v DC applied to the voltage supply terminal 8 is requisite for the normal operation of the chip, as described below. The power conductor 28 also is connected via sensitivity set resistor R3 to chip terminal 6. Ground conductor 30 directly is connected to chip ground terminal 4, and is connected by a timing capacitor C4 to chip terminal 7.

In the normal operational state of the GFI circuit, the SENSE coil 14 senses a current differential between the H and N lines, and the electrical signal indicative of this current differential, i.e. the sense or transformer output signal, is conducted to junctions J1, J2 and, in turn, to chip input terminals 2, 3. An amplifier internal to the chip 18 has a pair of inputs connected to input terminals 2, 3. This internal amplifier is operative to amplify the transformer output signal. A predetermined current threshold value indicative of a ground fault condition is established in advance for the chip, and in particular by the external sensitivity set resistor R3.

In a preferred embodiment, the predetermined current threshold is about 5 ma at which, and above which, the ground fault condition is signified. When the amplified transformer output signal is at least equal to, or exceeds, a value corresponding to the threshold value of about 5 ma, then the chip 18 is operative to generate a control output signal at trigger output terminal 1, which control signal then is conducted along conductor 32 to the gate of a silicon control rectifier (SCR). The conductor 32 is connected to ground conductor 30 by capacitor C2. The cathode of the SCR directly is connected to the ground conductor 30. The anode of the SCR is connected to ground conductor 30 through a capacitor C1, and also is connected to one end of a solenoid coil (SOL) whose other end is connected to H line conductor 26.

The control signal applied to the gate of the SCR triggers the SCR into full conduction. This permits the line current from the H line to flow along conductor 26 through the solenoid coil and through the conducting SCR to ground conductor 30. The solenoid coil thereby is energized by the line current.

A main line switch 34 has a first switch 36 with normally closed contacts in series with the H line, and a second switch 38 with normally closed contacts in series with the N line. The switches 36, 38 operably are coupled for simultaneous action with the solenoid coil. In the normally operating state of the main line switch 34, the switches 36, 38 are in their respective closed conducting states so that electrical power from a power supply is connected along the H and N lines through the closed switches 36, 38 to the load. However, when the control output signal is generated at chip output terminal 1, the SCR is triggered into full conduction, thereby causing the solenoid coil to be energized by the H line current and, in turn, the energized solenoid coil causes the switches 36, 38 to be switched to their respective open states so as to interrupt the supply of line current to the load.

Thus, when a ground fault current is sensed, and when the transformer output signal between the H and N lines is amplified and is at least equal to, or exceeds, the pre-set threshold value, then this signifies a ground fault condition. As described above, this ground fault condition causes the generation of the control output signal at chip terminal 1, and the processing of the control output signal opens the main switch 34, thereby to protect the electrical outlet by interrupting the flow of current to the load. The switches 36, 38 are maintained in the open state by being released by a spring latch 40. A manually-operated re-set button 42 is depressed to engage the latch and return the switches 36, 38 to their normally closed states so that normal operation can ensue once the ground fault condition has been corrected.

As described thus far, the embodiments of FIGS. 1 and 2 are identical in structure and function.

Turning, then, to one improvement in accordance with this invention, means operatively are connected to a control means for desensitizing the same, and for maintaining the control means in a desensitized state after the ground fault condition has been sensed and the supply of current to the load has been interrupted. In the desensitized state, the control means is not in its normally operating or fully energized state wherein it amplifies the transformer output signal and compares the same with the predetermined current threshold value. The control means also is not in a completely deenergized or off state because, as described below, at least some power greater than zero is applied to the control means.

The desensitizing means shown in FIG. 1 includes an auxiliary electrical switch S2 which operatively is coupled to the solenoid coil, and switchable upon energization of the latter between a normally open state and a tripped closed state. The auxiliary switch S2 is switchable substantially simultaneously with the switching of the main line switch 34. In the normally open state of the auxiliary switch S2, the main line switch 34 is closed so that line current flows along the H and N lines to the load. In the normally closed state of the auxiliary switch S2, the main line switch 34 has been opened, thereby interrupting the flow of line current to the load and indicating a ground fault condition. The desensitizing means of FIG. 1 also includes a visual indicator or light-emitting diode (LED) connected in series with one side of the switch S2 and the power conductor 28, and a surge-limiting resistor R4 connected in series with the other side of the switch S2 and the ground conductor 30.

When the auxiliary switch S2 is open during the normal operating state of the control means, the 30v DC voltage present across the conductors 28, 30 respectively is applied to chip terminals 8 and 4, thus powering the chip at its rated supply voltage to operate in its normally intended manner. In this mode of operation, the LED is extinguished, since no current flows therethrough because of the opened auxiliary switch S2.

In the tripped condition, i.e. after the switch S2 has been tripped to its closed state, the LED and the surge-limiting resistor R4 suddenly are connected across the conductors 28, 30 across the output of the bridge rectifier 22, and are operative to load down the voltage that actually is supplied to the control chip 18. Initially, the surge-limiting resistor R4 dissipates the energy surge to the LED and protects the same. In the steady-state condition, a voltage drop of about 2 volts exists across the LED, and a voltage drop of about 1 volt exists across the resistor R4, so that the conductors 28, 30 are loaded down from an initial voltage of about 30v DC to about 3v DC. This 3v DC supply voltage is applied to the voltage input terminal 8 of the chip 18. This 3v DC voltage is greater than zero volts, so that the chip 18 is not fully deenergized or shut off, but is less than the 30v DC supply voltage required for normal operation, so the chip is not fully energized or fully turned on. The chip 18 is, in effect, starved for power, or, in other words, is only slightly powered. This desensitized or dormant state for the chip 18 is between the fully deenergized and the fully energized states.

In the desensitized state, any electrical noise, such as electrical transients, extraneous current and voltage signals, power supply fluctuations, hash and the like, on the H and N lines from the power supply which is detected by the transformer assembly 12 and which is conducted to the control chip 18 no longer falsely can cause the latter to generate a control output signal at chip terminal 1. The chip simply is underpowered and cannot perform in its normally operational state.

However, the 3v DC supply voltage supplied to the chip 18 is sufficient to cause a transistor internal to the chip 18 and connected to the chip terminal 1 to remain on and constantly to present a low impedance to the gate of the SCR. If the chip 18 were completely deenergized, e.g. no voltage was supplied to chip terminal 8, then the aforementioned low impedance would not be present at the gate of the SCR, and the SCR could falsely be triggered into conduction by electrical noise. The SCR thus is rendered more resistant to false triggering during the tripped condition by reason of the slight powering of the control chip 18.

In addition, by preventing false triggering of the SCR, the flow of current through the solenoid coil during the tripped condition likewise is prevented. The solenoid coil thus is prevented from potential overheating during the tripped condition. No longer is it necessary to provide a GFI circuit with a solenoid coil at risk of overheating due to false triggering during the tripped condition following the detection of the ground fault condition. The solenoid coil now can be a less costly part than heretofore.

Of course, in the tripped state of the auxiliary switch S2, the LED is lit, thereby providing an immediate visual signal that a tripped condition exists and that the ground fault condition should be corrected. This is in contrast to most prior art GFI circuits which typically extinguish a light bulb during the tripped condition.

It will be appreciated that the control means in the desensitized state is, as noted above, not completely turned off as in prior art GFI circuits. Instead, sufficient power exists not only to illuminate the LED, but also sufficiently to power up the control chip 18 so as to present a low impedance to the gate of the SCR to prevent false triggering thereof.

Turning, next, to the FIG. 2 embodiment, the desensitizing means comprises only the auxiliary switch S2 which is connected across the junctions J1, J2 and, in effect, shorts the transformer output signal generated by the SENSE coil 14. By shorting the junctions J1, J2, i.e. by causing the transformer output signal thereat to approach zero, it is ensured that the transformer output signal always is below the threshold value set by the chip and, hence, no output control signal can be generated in response to a ground fault condition. Since the voltage supply terminal 8 of the chip 18 is supplied with its full rated 30v DC voltage, the chip is fully powered and it presents a low impedance to the gate of the SCR to prevent false triggering as described above. Also, as described above, the solenoid coil in the FIG. 2 embodiment is prevented from overheating and from having currents conducted therethrough after the ground fault condition because of the avoidance of the false triggering of the SCR. The embodiment of FIG. 2, of course, does not have the feature of visually indicating that a ground fault condition occurred.

It further will be appreciated that in both embodiments of FIGS. 1 and 2, the auxiliary switch S2 is located not in the H or N lines but, instead, in a circuit portion of the GFI circuit through which a supply current having a magnitude less than heretofore is conducted. In contrast to prior art embodiments which connect the auxiliary switch in series with the bridge rectifier and/or the H line, the placement of the auxiliary switch S2, in accordance with this invention, in a portion of the path which, in a preferred case, only handles milliamperes as opposed to amperes, has many advantages. For example, the auxiliary switch S2 no longer need handle such high-amperage currents and can be a less expensive component. Also, the problem of arcing is avoided.

In accordance with a preferred embodiment, the resistors R1 through R4 have the following resistance values, respectively: 15k ohms, 15k ohms, 0.82M ohms through 1.6M ohms, and 100 ohms.

In accordance with a preferred embodiment, the capacitors C1 through C9 have the following capacitance values, respectively: 0.01 microfarads, 0.01 microfarads, 1.0 microfarads, 0.015 microfarads, 0.01 microfarads, 22 microfarads, 120 picofarads, 3300 picofarads, and 47 picofarads.

It will be understood that each of the elements described above, or two or more together, may also find a useful application in other types of constructions differing from the types described above.

While the invention has been illustrated and described as embodied in a desensitized ground fault interrupter, it is not intended to be limited to the details shown, since various modifications and structural changes may be made without departing in any way from the spirit of the present invention.

For example, the LED and the surge-limiting resistor R4 could be replaced by a zener clamping diode operative for clamping the voltage at the chip voltage supply terminal 8 to less than 30v DC, and preferably at 3v DC.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an improved ground fault interrupter for protecting an electrical power outlet operative for supplying electrical alternating current along hot and neutral lines to a load, said interrupter being of the type including:
   (A) means for sensing a current differential between the lines, and for generating a sense output signal indicative of the current differential, and
   (B) control means operatively connected to the sensing means and energizable from an off state, said control means being operative for comparing the sense output signal to a predetermined current threshold indicative of a ground fault condition, and for interrupting the supply of current to the load when the sense output signal is at least equal to the predetermined current threshold,
   wherein the improvement comprises:
   means operatively connected to the control means for desensitizing the same, and for maintaining the control means in a desensitized state, other than the off state, after the ground fault condition has been sensed and the supply of current to the load has been interrupted.

2. The improvement as recited in claim 1, wherein the desensitizing means includes means for conditioning the sense output signal to be less than the predetermined current threshold.

3. The improvement as recited in claim 2, wherein the conditioning means is operative to cause the sense output signal to approach a zero value.

4. The improvement as recited in claim 3, wherein the sensing means includes a differential transformer operatively connected with the lines and having a pair of outputs across which the sense output signal is present; and wherein the conditioning means includes an electrical switch operatively connected across the outputs of the differential transformer and having an open and a closed switching state, said electrical switch being operatively connected to the control means and switchable by the latter from the open to the closed switching state to short thereby the outputs of the differential transformer and cause the sense output signal to approach the zero value.

5. The improvement as recited in claim 1, wherein the control means includes a control subcircuit powerable from a powered state in which the control subcircuit is fully deenergized to a power-on state in which the control subcircuit is fully energized, and wherein the desensitizing means includes starving means for powering the control subcircuit to a partially powered state intermediate the power-off and the power-on states, thereby to maintain the control means in the desensitized state.

6. The improvement as recited in claim 5, wherein the control subcircuit has a voltage supply input and a ground input, and wherein the desensitizing means includes an electrical switch operatively connected to the starving means and across the voltage supply input and the ground input of the control subcircuit, said switch having an open and a closed switching state and being operatively connected to the control means and switchable by the latter from the open to the closed switching state to connect the starving means across the voltage supply input and the ground input of the control subcircuit and thereby to starve the supply of power to the control subcircuit.

7. The improvement as recited in claim 6, wherein the starving means includes a visual indicator for emitting light after the ground fault condition has been sensed and during the interruption of the supply of current to the load.

8. The improvement as recited in claim 7, wherein the indicator is a light emitting diode, and the starving means also includes a surge limiting resistor in series with the diode.

9. The improvement as recited in claim 1, wherein the control means includes a control subcircuit for generating a control signal when the sense output signal is at least equal to the predetermined current threshold, a gate element triggerable into a current conducting state when the control signal is generated, and a solenoid-operated main switch for interrupting the supply of line current to the load when the gate element has been triggered; and wherein the desensitizing means includes an auxiliary switch operably coupled to the solenoid-operated main switch and switchable from an open to a closed switching state upon detection of the ground fault condition.

10. The improvement as recited in claim 9, wherein the desensitizing means includes a visual indicator operative for emitting light when the auxiliary switch has switched to the closed switching state upon detection of the ground fault condition.

11. In an improved ground fault interrupter for protecting an alternating current power outlet operative for supplying an electrical line current along hot and neutral lines to a load, said interrupter being of the type including:

(A) means for sensing a current differential between the lines, and for generating a sense output signal indicative of the current differential, and (B) control means operatively connected to the sensing means and energizable from an off state, said control means being operative for comparing the sense output signal to a predetermined current threshold indicative of a ground fault condition, and for interrupting the supply of line current to the load when the sense output signal is at least equal to the predetermined current threshold, wherein the improvement comprises:

means operatively connected to the control means for visually indicating the sensing of the ground fault condition, said indicating means including a light emitting element and an electrical switch connected to the latter and switchable by the control means from an off state in which the light emitting element is extinguished, to a closed state in which the light emitting element is lit, said control means being operative, during the interruption of the supply of line current to the load, to draw from the line current a supply current having a magnitude less than the line current, said switch and said light emitting element being so connected to the control means to conduct said supply current through the switch and the light emitting element.

12. The improvement as recited in claim 11, wherein the control means includes a control subcircuit powerable from a power-off state to a power-on state in which the control subcircuit is fully deenergized and fully energized, respectively, and operative in the power-on state for generating a control signal to switch the electrical switch to the closed state, and wherein the control means further includes starving means so connected to the indicating means as to partially energize and starve power from the control subcircuit after the ground fault condition has been detected, thereby to desensitize the control means.

* * * * *